United States Patent Office 2,766,278
Patented Oct. 9, 1956

2,766,278

4-MONOALKYLAMINOSALICYLIC ACIDS AND 4-MONOALKYLOXYALKYLAMINOSALICYLIC ACIDS

Walter Grimme, Utfort, Moers, Hans Emde, Homberg, Lower Rhine, Heinrich Schmitz, Moers, Meerbeck, and Johannes Wöllner, Moers, Germany, assignors to Rheinpreussen Aktiengesellschaft für Bergbau und Chemie, Homberg, Germany, a German corporation No Drawing. Application August 4, 1952,
Serial No. 302,622

Claims priority, application Germany August 10, 1951

1 Claim. (Cl. 260—519)

This invention relates to 4-monoalkylaminosalicylic acids and 4-(mono-alkyloxyalkyl)-aminosalicylic acids.

One object of this invention is the production of 4-monoalkylaminosalicylic acids and 4-(mono-alkyloxyalkyl)-aminosalicylic acids which have been found to be valuable starting and intermediate products for the preparation of highly useful therapeutic agents.

The alkylated or alkyloxy alkylated 4-amino-salicylic acids in accordance with the invention have the general formula:

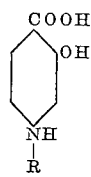

in which R is an alkyl or alkyloxyalkyl group having at least two carbon atoms in the alkyl portion bound to the nitrogen atom. The alkyl groups, represented by R, may be any alkyl groups which contain up to 10 carbon atoms. These alkyl groups may be straight-chained or branched. Suitable alkyl groups are, for example, ethyl, propyl, isopropyl, n-butyl, hexyl, or decyl groups. Instead of a simple alkyl group, R may also be an ether group having at least two carbon atoms in the alkyl portion bound to the nitrogen atom, such as methoxyethyl, ethoxyethyl, methoxypropyl, methoxybutyl, ethoxybutyl, the total sum of the carbon atoms of these ether radicals being likewise not more than 10 carbon atoms.

The alkylated or alkyloxyalkylated aminosalicylic acids in accordance with the invention may be prepared by subjecting 4-aminosalicylic acids (4-amino-2-oxybenzoic acid) to an alkylation reaction. The alkylation may, for example, be effected by reacting 4-aminosalicylic acid with substituted or non-substituted aldehydes or ketones having at least two carbon atoms and preferably 2 to 10 carbon atoms, in water and/or an organic solvent and by reducing the N-alkylidine compounds formed with hydrogen and hydrogenation catalysts.

As organic solvents may be used primary or secondary alcohols, such as ethanol, propanol, isopropanol, or diluted alcohols.

The hydrogenation is preferably effected at increased temperatures of 15 to 60° C., preferably 20–30° C. at atmospheric pressure or pressures up to 50 atmospheres, preferably 20–30 atmospheres. In accordance with the invention, it is not necessary to isolate the 4-N-alkylidine compounds formed. It is merely possible to directly subject the condensation product from the 4-aminosalicylic acid and the solution containing the aldehyde or ketone to the hydrogenation reaction.

The hydrogenation may be effected with any of the known or conventional hydrogenation catalysts. Catalysts such as platinum oxide, Palladium black or Raney nickel have proven particularly advantageous for the hydrogenation. Platinum oxide is used in quantities of 2–5 percent, in relation to the quantity of the used 4-amino salicylic acid. By using Raney nickel, it is necessary to increase the amount of catalyst to 5–10 percent. These catalysts may be added to the 4-aminosalicylic acid suspended or dissolved in water or a solvent as indicated above and hydrogen may be passed through. The aldehyde or ketone may be added to this mixture continuously or intermittently at such a rate that the primarily produced 4-N-alkylidine compounds are immediately reduced to the 4-N-alkyl or 4-N-alkyloxyalkyl compounds. This embodiment has proven most economical in the entire operation and has the further advantage that larger yields of the desired final products are obtained. In reaction, it has been found preferable to use the aldehyde or ketone in excess.

Suitable aldehydes and ketones for this reaction are, for instance, acetaldehyde, propionaldehyde, isobutyraldehyde, n-butyraldehyde, methoxyacetaldehyde, ethoxyacetaldehyde, methoxypropionaldehyde, methoxybutyraldehyde, ethoxybutyraldehyde; acetone, methylethylketone, diethylketone, methylpropylketone, ethylpropylketone, methylmethoxymethyl ketone, etc.

The monoalkylated or the monoalkyloxyalkylated amino salicylic acid in accordance with the invention may also be prepared by reacting 4-aminosalicylic acid with a substituted or unsubstituted alkyl halide or alkyloxyalkyl halide which contains at least two and preferably two to ten carbon atoms in the alkyl group. The halides used are preferably bromides or iodides, but chlorides are also usable. When using alkyl chlorides, it is of advantage to add a small quantity (up to 2%) of sodium or potassium iodide. The reaction is effected by contacting the components in water and/or an organic solvent at temperatures of 20–100° C. Primary and secondary alcohols such as ethanol, methanol, propanol, isopropanol, have been found particularly well suited for use as the organic solvent, but also other organic liquids, such as aromatic hydrocarbons like benzene can be used. It is essential that the reaction be effected in the presence of at least a sufficient amount of alkali or earth alkali so that the reaction medium will always remain alkaline. The pH value is preferably in the range of 8–13. This will greatly repress the tendency of the 4-aminosalicylic acid to decompose upon heating into m-aminophenol and carbon dioxide. Examples of the alkalis which may be used include the oxides, hydroxides, carbonates and bicarbonates of the alkali (Na, K) and earth alkali metals (Ca, Mg). Suitable halides for this reaction are, for instance, ethylchloride, propylchloride, isopropylchloride, butylchloride, hexylchloride, or decylchloride, methoxyethylchloride, ethoxyethylchloride, methoxypropylchloride, ethoxypropylchloride, methoxybutylchloride or ethoxyethylchloride, as well as the corresponding bromides and iodides.

The preparation of the 4-aminosalicylic acid which is used as starting material has been described for instance in "Helvetica Chimica Acta," of the year 1948, pages 988–992.

The following examples are given to further illustrate the invention and not to limit the same.

Example 1

153 grams 4-aminosalicylic acid (1 mol) are suspended in 300 cc. of isopropanol and there upon a solution of 72 grams n-butyraldehyde (1 mol) in 100 cc. isopropanol is added. The solution becomes red as the 4-aminosalicylic acid dissolves. This clear solution is then treated in the presence of Raney nickel in an autoclave at room temperature under a pressure of 20 atmospheres with hydrogen until the absorption of the hydrogen has terminated. It is filtered away from the catalyst and the solution evaporated in vacuum until dry. The residue is extracted several times while hot with ethyl acetate. The solvent is evaporated away from the combined extracts and the residue, recrystallized from benzene there being obtained 4-N-n-butylaminosalicylic acid of a melting point of 134–135° C. (decomposition).

*Example II*

15.3 grams 4-aminosalicylic acid (1/10 mol) are dissolved hot in 200 cc. of 96% ethyl alcohol and, after the addition of 0.5 gram platinum oxide and 7.2 grams n-butyraldehyde (1/10 mol), shaken in a 1-liter flask at room temperature and a slight excess pressure with hydrogen. After about 2 hours the calculated quantity of hydrogen has been practically absorbed. After filtering away from the catalyst the solution is evaporated in vacuum. The crystalline 4-N-n-butylaminosalicylic acid is recrystallized from a small amount of ethyl acetate. Needles are formed with a melting point of 134–135° C. (decomposition).

*Example III*

3.82 grams 4-aminosalicylic acid (1/40 mol) are dissolved in the hot in 80 cc. isopropanol and shaken in a 250 cc. shaking flask at room temperature in the presence of Raney nickel under hydrogen. Thereupon 7.2 grams n-butyraldehyde (1/40 mol) is added in portions of 1 cc. every half hour. The reaction solution is thereupon treated as in Example I. After the recrystallization from a small amount of ethyl acetate the 4-N-n-butylaminosalicylic acid is obtained in the form of needles of a melting point of 134–135° C. (decomposition).

*Example IV*

15.3 grams 4-aminosalicylic acid (1/10 mol) are dissolved in the hot in 200 cc. 96% ethyl alcohol and thereupon in the presence of Raney nickel, a solution of 23.3 grams acetone (4/10 mol) in 150 cc. 96% ethyl alcohol is added drop by drop during the course of the hydrogenation. After the absorption of the theoretical quantity of hydrogen, the solution is filtered away from the catalyst and evaporated to dryness in a vacuum. The residue is recrystallized from benzene. The 4-isopropylaminosalicylic acid thus obtained has a melting point of 120° C. (decomposition).

*Example V*

15.3 grams 4-aminosalicylic acid (1/10 mol) suspended in 260 cc. isopropanol, are shaken in the presence of Raney nickel with hydrogen at room temperature and about 1.2 atmospheres pressure, and at the same time a solution of 29.6 grams methoxyacetaldehyde in 110 cc. isopropanol is added drop by drop. After the completion of the absorption of the hydrogen, the solution is separated from the catalyst and evaporated in a vacuum. The residue after recrystallization from dilute alcohol gives 4-methoxyethylaminosalicylic acid of a melting point of 143° C. (decomposition).

*Example VI*

153 grams 4-aminosalicylic acid (1 mol) and 138 grams potassium carbonate (1 mol) are heated to 70° C. in two liters 75% isopropylalcohol. While stirring 125 grams n-propylbromide (1 mol) are added drop by drop over the course of 7 hours. After a further 5 hours the solution is evaporated in a vacuum and the reaction material extracted with water. After separation of the water insoluble portion the aqueous solution is acidified to a pH of 4 to 5. The crude 4-n-propylaminosalicylic acid obtained is recrystallized from benzene and then from ethyl acetate and the product obtained has a melting point of 134° C. (decomposition).

*Example VII*

153 grams 4-aminosalicylic acid and 138 grams potassium carbonate are dissolved in 500 cc. water. After the addition of 103 grams n-butylbromide the solution is heated gradually, while stirring, to 80 to 85° C. and the reaction mixture is maintained at this temperature for 3 hours. After the addition of 40 grams potassium carbonate in 40 grams n-butylbromide, it is stirred for a further hour at 85° C., cooled and separated from the lower layer. The aqueous solution is acidified to a pH of 4 to 5. The crude 4-n-butylaminosalicylic acid obtained is recrystallized from benzene after drying. Small scales are obtained with a melting point of 133–134° C.

*Example VIII*

15.3 grams 4-aminosalicylic acid, 14 grams $K_2CO_3$ and 19 grams β-methoxyethyliodide are heated under reflux for 8 hours in 50 cc. 50% ethyl alcohol. After evaporation in a vacuum, the contents of the flask are dissolved in water and the solution is clarified by treatment with animal charcoal and filtration. After acidifying to a pH 4, the separated crude 4-β-methoxyethylaminosalicylic acid is filtered off and recrystallized from aqueous alcohol. Needles of a melting point of 143° C. (decomposition) are obtained.

We claim:

Method for the production of 4-monoalkylaminosalicylic acids and 4-monoalkyloxyalkylaminosalicylic acids which comprises passing hydrogen in contact with 4-aminosalicylic acid in a solvent selected from the group consisting of water and organic solvents containing a hydrogenation catalyst, adding a member selected from the group consisting of substituted and unsubstituted aldehydes and ketones at a rate so that the 4-N-alkylidine compounds produced are reduced directly to a member of the group consisting of 4-N-alkyl and 4-N-alkyloxyalkyl compounds, and recovering a 4-monoalkylated aminosalicylic acid.

References Cited in the file of this patent

UNITED STATES PATENTS

| | | |
|---|---|---|
| 427,565 | Gnehm et al. | May 13, 1890 |
| 2,548,257 | Goldberg et al. | Apr. 10, 1951 |
| 2,639,294 | Rosdahl | May 19, 1953 |

OTHER REFERENCES

Degering: "Outline of Orig. Nitrogen Compounds," pp. 298–9 (1945).

Adkins: "Reactions of Hydrogen" (Wisconsin), pp. 55–56 (1946).

Rosdahl: Svensk Kem. Tid., vol. 60, p. 13 (1948).